US007894354B2

(12) United States Patent
Grovenburg (10) Patent No.: US 7,894,354 B2
(45) Date of Patent: Feb. 22, 2011

(54) SYSTEM AND METHOD TO MONITOR RTP STREAMS USING RTCP SR/RR PACKET INFORMATION (75) Inventor: William Grant Grovenburg, Monument, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 2605 days.

(21) Appl. No.: 10/263,903

(22) Filed: Oct. 4, 2002

(65) Prior Publication Data

US 2004/0066753 A1  Apr. 8, 2004

(51) Int. Cl.
G01R 31/08 (2006.01)
(52) U.S. Cl. ...................... 370/252; 370/242
(58) Field of Classification Search .......... 370/230, 370/230.1, 242, 252, 389, 392, 243, 244, 370/245, 352
See application file for complete search history.

(56) References Cited

U.S. PATENT DOCUMENTS

| | | | | |
|---|---|---|---|---|
| 5,428,776 A | * | 6/1995 | Rothfield | 707/4 |
| 6,122,514 A | * | 9/2000 | Spaur et al. | 455/448 |
| 6,678,250 B1 | * | 1/2004 | Grabelsky et al. | 370/241 |
| 6,691,167 B2 | * | 2/2004 | Procopio et al. | 709/235 |
| 7,047,316 B2 | * | 5/2006 | Iwata et al. | 709/240 |
| 7,123,627 B2 | * | 10/2006 | Kowalski | 370/468 |
| 2002/0015387 A1 | * | 2/2002 | Houh | 370/250 |
| 2003/0007458 A1 | * | 1/2003 | Procopio | 370/252 |
| 2004/0073641 A1 | * | 4/2004 | Minhazuddin et al. | 709/223 |

FOREIGN PATENT DOCUMENTS

WO  0031963  6/2000

OTHER PUBLICATIONS

H. Schulzrinne et al. Network Working Group Request for Comments: 1889 Category: Standards Track, Audio-Video Transport Working Group, Jan. 1996, A Transport Protocol for Real-Time Applications, pp. 1-75.
Tomohiko Ogishi, Shigehiro Ano and Toshihiko Kato—"Design Of Performance Monitor Collecting Statistics Of VoIP Traffic"; KDDI R&D Laboratories; 5 pages; Information Processing Society of Japan.

* cited by examiner

Primary Examiner—Ricky Ngo
Assistant Examiner—Christine Ng
(74) Attorney, Agent, or Firm—Matthew A. Pequignot; Pequignot + Myers LLC (57) ABSTRACT An apparatus and method monitor RTP streams between first and second endpoints within a network. A network analyzer is connected at an intermediate point between the first and second endpoints within the network, to extract and process data from RTCP packets to select and monitor the RTP streams accumulated therein having a worst-case jitter and packet loss within the network.

20 Claims, 7 Drawing Sheets

FIG. 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|   RC    |   PT=SR=200   |             length            | header
+-+-+-+-+-+-+-+-+-+-+-+-+-+-+-+-+-+-+-+-+-+-+-+-+-+-+-+-+-+-+-+-+
|                         SSRC of sender                        |
+=+=+=+=+=+=+=+=+=+=+=+=+=+=+=+=+=+=+=+=+=+=+=+=+=+=+=+=+=+=+=+=+
|              NTP timestamp, most significant word             | sender
+-+-+-+-+-+-+-+-+-+-+-+-+-+-+-+-+-+-+-+-+-+-+-+-+-+-+-+-+-+-+-+-+ info
|             NTP timestamp, least significant word             |
+-+-+-+-+-+-+-+-+-+-+-+-+-+-+-+-+-+-+-+-+-+-+-+-+-+-+-+-+-+-+-+-+
|                         RTP timestamp                         |
+-+-+-+-+-+-+-+-+-+-+-+-+-+-+-+-+-+-+-+-+-+-+-+-+-+-+-+-+-+-+-+-+
|                     sender's packet count                     |
+-+-+-+-+-+-+-+-+-+-+-+-+-+-+-+-+-+-+-+-+-+-+-+-+-+-+-+-+-+-+-+-+
|                      sender's octet count                     |
+=+=+=+=+=+=+=+=+=+=+=+=+=+=+=+=+=+=+=+=+=+=+=+=+=+=+=+=+=+=+=+=+
|                 SSRC_1 (SSRC of first source)                 | report
+-+-+-+-+-+-+-+-+-+-+-+-+-+-+-+-+-+-+-+-+-+-+-+-+-+-+-+-+-+-+-+-+ block
| fraction lost |       cumulative number of packets lost       |   1
-+-+-+-+-+-+-+-+-+-+-+-+-+-+-+-+-+-+-+-+-+-+-+-+-+-+-+-+-+-+-+-+
|             extended highest sequence number received         |
+-+-+-+-+-+-+-+-+-+-+-+-+-+-+-+-+-+-+-+-+-+-+-+-+-+-+-+-+-+-+-+-+
|                         interarrival jitter                   |
+-+-+-+-+-+-+-+-+-+-+-+-+-+-+-+-+-+-+-+-+-+-+-+-+-+-+-+-+-+-+-+-+
|                          last SR (LSR)                        |
+-+-+-+-+-+-+-+-+-+-+-+-+-+-+-+-+-+-+-+-+-+-+-+-+-+-+-+-+-+-+-+-+
|                      delay since last SR (DLSR)               |
+=+=+=+=+=+=+=+=+=+=+=+=+=+=+=+=+=+=+=+=+=+=+=+=+=+=+=+=+=+=+=+=+
|                 SSRC_2 (SSRC of second source)                | report
+-+-+-+-+-+-+-+-+-+-+-+-+-+-+-+-+-+-+-+-+-+-+-+-+-+-+-+-+-+-+-+-+ block
:                               ...                             :   2
+=+=+=+=+=+=+=+=+=+=+=+=+=+=+=+=+=+=+=+=+=+=+=+=+=+=+=+=+=+=+=+=+
|                      profile-specific extensions              |
+-+-+-+-+-+-+-+-+-+-+-+-+-+-+-+-+-+-+-+-+-+-+-+-+-+-+-+-+-+-+-+-+
```

FIG. 2

| 0                     | 1                   | 2                   | 3         |
|-----------------------|---------------------|---------------------|-----------|
| 0 1 2 3 4 5 6 7 8 9   | 0 1 2 3 4 5 6 7 8 9 | 0 1 2 3 4 5 6 7 8 9 | 0 1       |

| V=2 | P | RC | PT=RR=201 | LENGTH | ← HEADER |
|---|---|---|---|---|---|
| SSRC OF PACKET SENDER ||||||
| SSRC_1 (SSRC OF FIRST SOURCE) |||||← REPORT BLOCK 1|
| FRACTION LOST | CUMULATIVE NUMBER OF PACKETS LOST ||||
| EXTENDED HIGHEST SEQUENCE NUMBER RECEIVED |||||
| INTERARRIVAL JITTER |||||
| LAST SR (LSR) |||||
| DELAY SINCE LAST SR (DLSR) |||||
| SSRC_2 (SSRC OF SECOND SOURCE) |||||← REPORT BLOCK 2|
| . . . |||||
| PROFILE-SPECIFIC EXTENSIONS |||||

SYSTEM AND METHOD TO MONITOR RTP STREAMS USING RTCP SR/RR PACKET INFORMATION

BACKGROUND OF THE INVENTION

A real-time protocol (RTP) provides end-to-end network transport functions suitable for applications transmitting real-time data, such as audio, video or simulation data, over multicast or unicast network services. RTP does not address resource reservation and does not guarantee quality-of-service for real-time services. The data transport is augmented by a control protocol (RTCP) to allow monitoring of data delivery in a manner scalable to large multicast networks, and to provide minimal control and identification functionality. RTP and RTCP are designed to be independent of underlying transport and network layers. Presently, monitoring systems are unable to determine worst-case RTP streams at an arbitrary point within a network to monitor quality of a voice call or quality in data transmission, for instance. One of the problems involved in determining the worst-case RTP streams is that of available processing power to examine and analyze every RTP stream transmitted between endpoints. For instance, at the arbitrary point within the network, thousands of RTP streams pass through, thus, analyzing each RTP stream that passes through the arbitrary point cannot be done by existing processing technology.

To date, analyzing the worst-case RTP streams has been performed using two approaches. The first approach examines the RTCP RR (receiver report) packets and RTCP SR (sender report) packets, which occur at a much lower rate (i.e., 5% or less of a bandwidth of the RTP stream). However, the RTCP RR packets include jitter and packet loss information as seen from the endpoints of the network, which prevents determining where a problem may be originating within the network. The jitter and packet loss information are not acceptable because a user examining the RTP streams is unable to determine at which point within the network a problem is originating. The second approach monitors the RTP packet streams. With no selection criteria, the RTP streams are selected on a first observed order. While the second approach may provide accurate information, there is insufficient processing power available to monitor all the RTP streams.

SUMMARY OF THE INVENTION

Various objects and advantages of the invention will be set forth in part in the description that follows and, in part, will be obvious from the description, or may be learned by practice of the invention.

To achieve the above and other objects, the present invention provides an apparatus to monitor RTP streams between first and second endpoints within a network, the apparatus including: a network analyzer connected at an intermediate point between the first and second endpoints within the network, to extract and process data from RTCP packets to select and monitor the RTP streams accumulated therein having a worst-case jitter and packet loss within the network.

To achieve the above and other objects, the present invention further provides a method to monitor RTP streams between first and second endpoints within a network, including: extracting RTCP packets transmitted between the first and the second endpoints at an intermediate point between the first and second endpoints; parsing the RTCP packets and extracting data therefrom; accumulating the RTP streams corresponding to each RTCP packet; selecting at least one of the data extracted from the RTCP packets; sorting the RTCP packets based on the at least one of the data selected; and selecting a predetermined number of the RTCP packets to process and determine a point within the network producing data transmission errors.

To achieve the above and other objects, the present invention further provides a method to monitor RTP streams between first and second endpoints within a network, including: selecting an intermediate point between the first and second endpoints within the network; extracting RTCP SR/RR packets transmitted between the first and the second endpoints; parsing the RTCP SR/RR packets and extracting data therefrom; accumulating the RTP streams corresponding to each RTCP SR/RR packet; selecting at least one of the data extracted from the RTCP SR/RR packets; sorting the RTCP SR/RR packets and the corresponding RTP streams based on the at least one of the data selected; selecting a predetermined number of the RTCP SR/RR packets and/or the RTP streams having highest data values; and extracting additional data from the selected RTCP SR/RR packets and/or the corresponding RTP streams to determine a location at or between the first and second endpoints within the network producing data transmission errors.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 1:
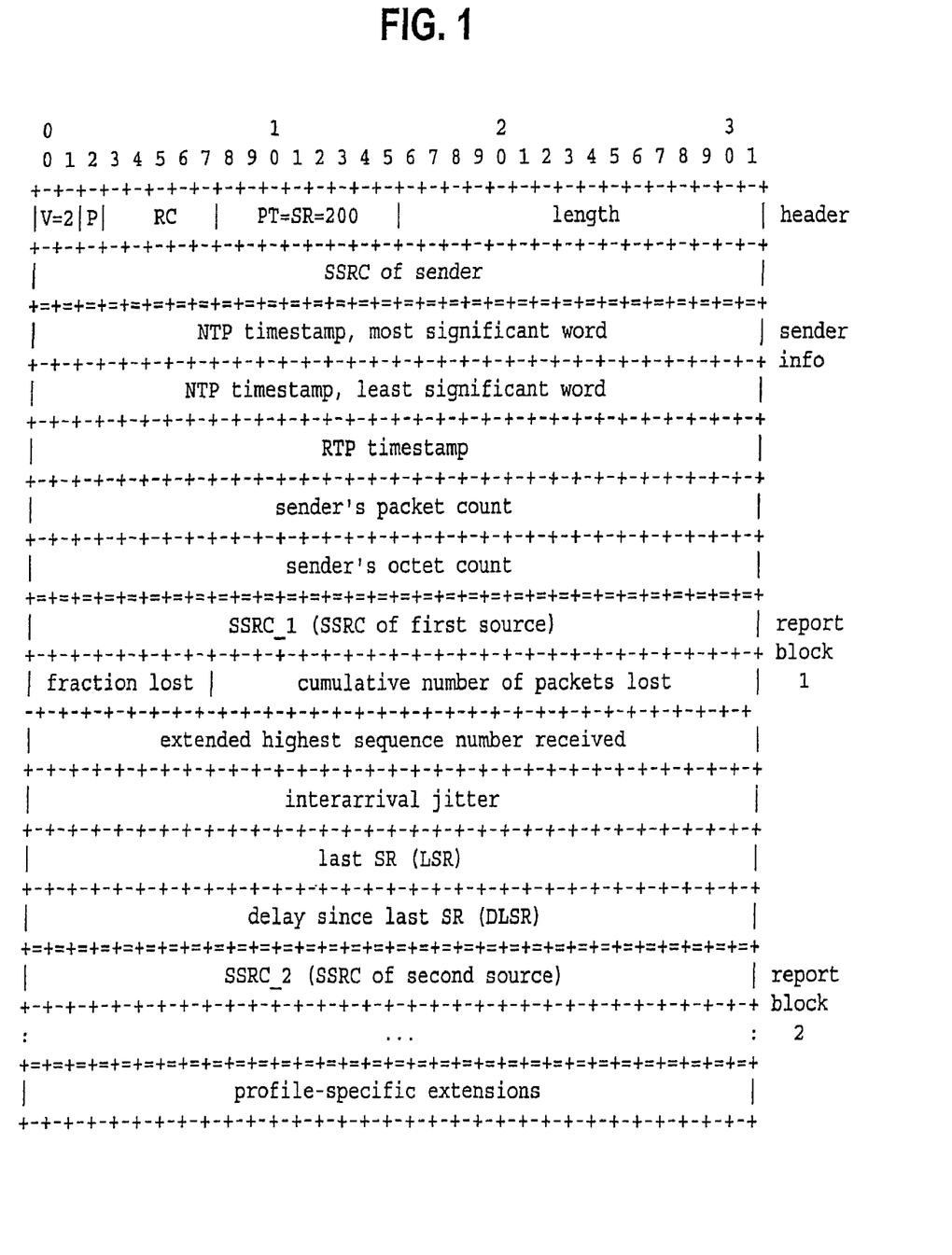
FIG. 1 is a diagram illustrating a sender report RTCP packet.
Figure 2:
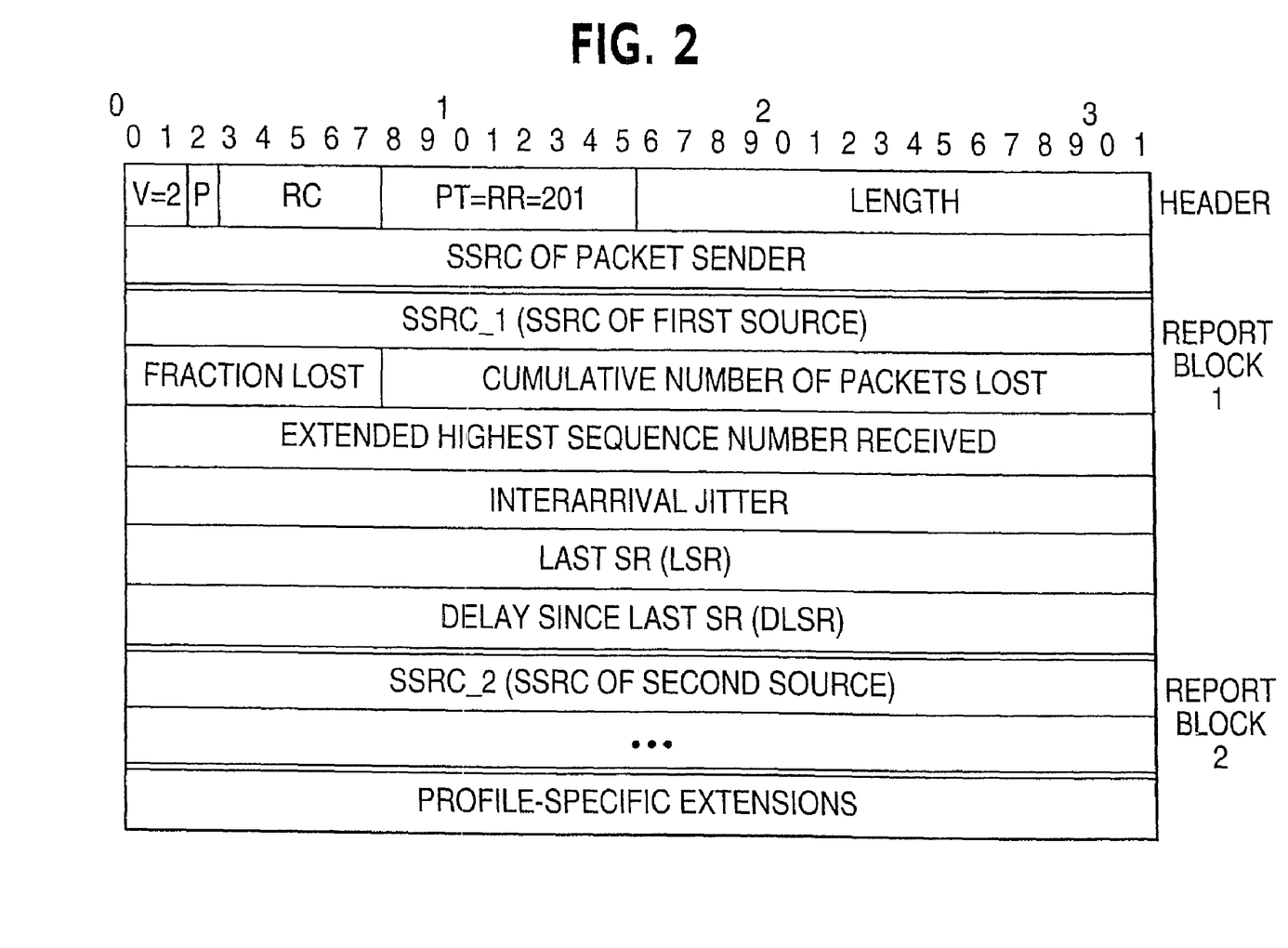
FIG. 2 is a diagram illustrating a receiver report RTCP packet.

An RTP stream has header fields that are either fixed or deterministically varying, with a certain format. These fields include fields for a sequence number, time stamp, synchronization source identifiers, and contributing source identifiers. The header fields can be extended with RTP header extension to provide new payload-format-independent functions that require additional information to be carried in an RTP data packet header. Additionally, RTCP packets in the RTP stream have a packet format and header fields for control information. The RTCP header includes timing information and a sequence number that allows a far-end telephone receiver (i.e., receiver) to reconstruct the timing produced by a local telephone source (i.e., source). FIG. 1 illustrates a sender report RTCP packet showing header, sender information, report block 1, and report block 2. FIG. 2 illustrates a receiver report RTCP packet. A format of the receiver report (RR) packet is the same as that of the sender report (SR) packet except that a packet type field contains a constant 201 and five words of sender information (i.e., NTP and RTP timestamps and sender's packet and octet counts) are omitted. An RTCP packet may contain a RR Receiver Report or a SR Sender Report, or the packet may contain both RR and SR reports.

The RTP stream typically includes between 30 to 50 RTP data packets per second and an RTCP packet will be sent at intervals of typically 2 seconds to 5 seconds. The RTCP packet may be a sender report (SR) and/or a receiver report (RR) packet. If both report types are present they will be combined into the same physical packet. From each SR and RR packet, according to an embodiment of the present invention, information may be extracted and processed periodically and provided to a user for monitoring. Because of a large number of data packets in the RTP streams transmitted between the source and the receiver, a processor monitoring the RTP streams including a data buffer, for instance, does not have enough processing power and capacity to monitor all the RTP streams. In these instances, data overrun inside the data buffer of the monitoring instrument, where the RTP streams are overlaid, typically occurs. In the present invention, rather than examining every RTP stream, the RTCP packets, which are summary packets within the RTP streams and which occur at a much lower rate than the RTP streams, are used to select and monitor worst-case RTP streams.

The SR packet and the RR packet may be within the same RTCP packet or may be provided in separate RTCP packets. For illustrative purposes, an embodiment in accordance with the present invention will be described herein where the RTCP packet includes both the SR and RR packets, however, in an alternative embodiment, the RTCP packet may include the RR packet or the SR packet.

Figure 3:
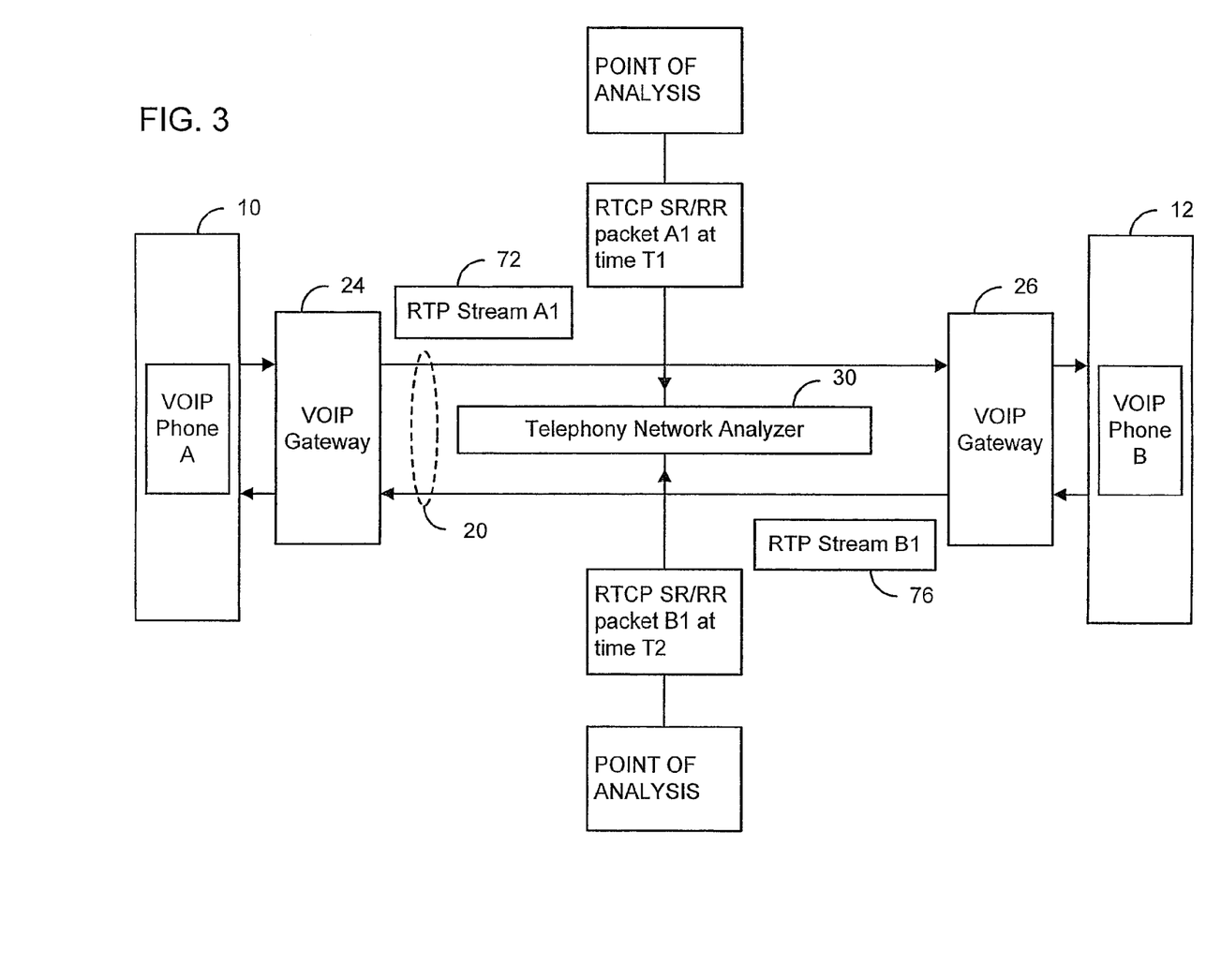
FIG. 3 is a diagram illustrating a configuration of a telecommunications system, which monitors RTP streams, in accordance with an embodiment of the present invention.

FIG. 3 is a diagram illustrating a configuration of a telecommunications system, which monitors the RTP streams using the RTCP packets, in accordance with an embodiment of the present invention. A calling telephone 10 (i.e., source) and a receiving telephone 12 (i.e., receiver) access a telecommunications network 20 through VOIP (Voice Over Internet Protocol) gateways 24, 26. In the alternative, the telecommunications network 20 may be a variable delay network such as LAN/WAN or other IP network. The VoIP gateways 24, 26 route calls between the source 10 and the receiver 12 over the network 20 using Internet Protocol and perform RTP jitter buffering and encapsulation of audio frames using the RTP header. Current systems require that the network analyzer be connected to a network endpoint to which the source 10 or the receiver 12 is directly connected, in order to monitor the RTP streams between at the source 10 and at the receiver 12. Contrary to present systems where a telecommunications, cable, or Internet service provider must connect a network analyzer to monitor data delivery at the source 10 or the receiver 12, that is, at end points of the telephone network, the present system allows the provider to connect the network analyzer anywhere within the network. Thus, a service person, for instance, has the flexibility to connect the network analyzer incorporating the system of the present invention at any location within the network.

A telephony network analyzer 30, such as "J6844A Telephony Network Analyzer" of AGILENT TECHNOLOGIES, Inc. of Andover, Mass., may be connected within the network 20 to monitor the IP traffic (e.g., RTP data) between the source 10 and the receiver 12. The telephony network analyzer 30 also includes a processor having permanent or removable storage, such as magnetic and optical discs, RAM, ROM, etc., on which the process or method and data structures of the present invention can be stored and distributed. Though there is shown one telecommunications network 20, there may be more than one.

Figure 4:
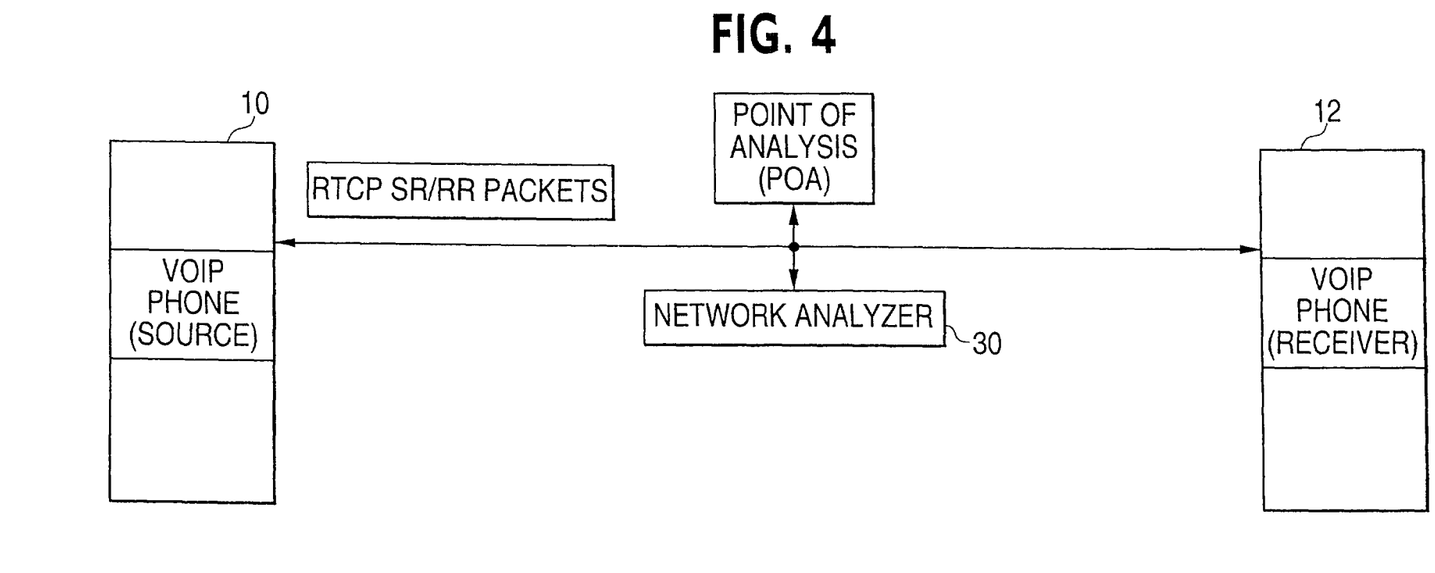
FIG. 4 is a diagram illustrating the system to monitor RTCP SR/RR packets between a source and a receiver, in accordance with an embodiment of the present invention.

FIG. 4 is a diagram illustrating a system to monitor the RTCP SR/RR packets between the source 10 and the receiver 12, in accordance with an embodiment of the present invention. A Point of Analysis (POA) refers to a point within a network where the network analyzer 30 is connected to monitor the RTP streams containing the RTCP SR/RR packets, in accordance with an embodiment of the present invention. As shown in FIG. 4, from the source 10, RTP streams and the RTCP SR packets are output to the receiver 12. The receiver 12 receives and sends back the RTP streams and the RTCP RR packets to the source 10. At the POA, the network analyzer extracts the SR/RR packets to monitor the RTP streams.

Once the network analyzer is connected at the POA within the network, Internet or communications traffic is monitored between the source 10 and the receiver 12. The RTCP packets contains a summary of what the endpoints (i.e., the source 10 and the receiver 12) are seeing and appears at a much lower data rate, typically 250:1 times less often than the RTP data packets. Accordingly, the network analyzer, in accordance with an embodiment of the present invention, is designed to extract and monitor RTCP SR/RR packets between the source 10 and the receiver 12 at the POA. The network analyzer extracts RTCP SR/RR packets using conventional methods. Once the network analyzer extracts the RTCP SR/RR packet at the POA, the RR packet is parsed and jitter and packet loss data are extracted therefrom. Similarly, the SR packet is parsed and data corresponding to a number of packets and octets sent is extracted therefrom. Additional information may be provided by and extracted from the SR/RR packets, such as round-trip delay information, which is calculated using a combination of the SR/RR packets, average jitter, standard deviation, and time duration of the RTP stream. Thus, because the RTCP information comes at a much lower data rate, it is possible for the network analyzer to be able to keep track of the RTCP packets rather than attempting to keep track of the entire RTP stream.

Furthermore, a quality of service (QOS) may be determined based on the jitter and the packet loss where each is provided a weighing value and thresholds. User definable thresholds for both jitter and packet loss are provided. The user definable thresholds prevent jitter, or packet loss, from lowering the QOS until a value of the QOS rises above the user definable threshold. QOS also considers a relative weighting of jitter or packet loss. The relative weighting in set by a slider bar via a user interface (not shown), where the weighting importance of jitter is set to be 100% at one end of the slider bar and the weighting importance of packet loss to be 100% at another end of the slider bar. In a middle of the slider bar jitter and packet loss are equal at 50% each.

Figure 5:
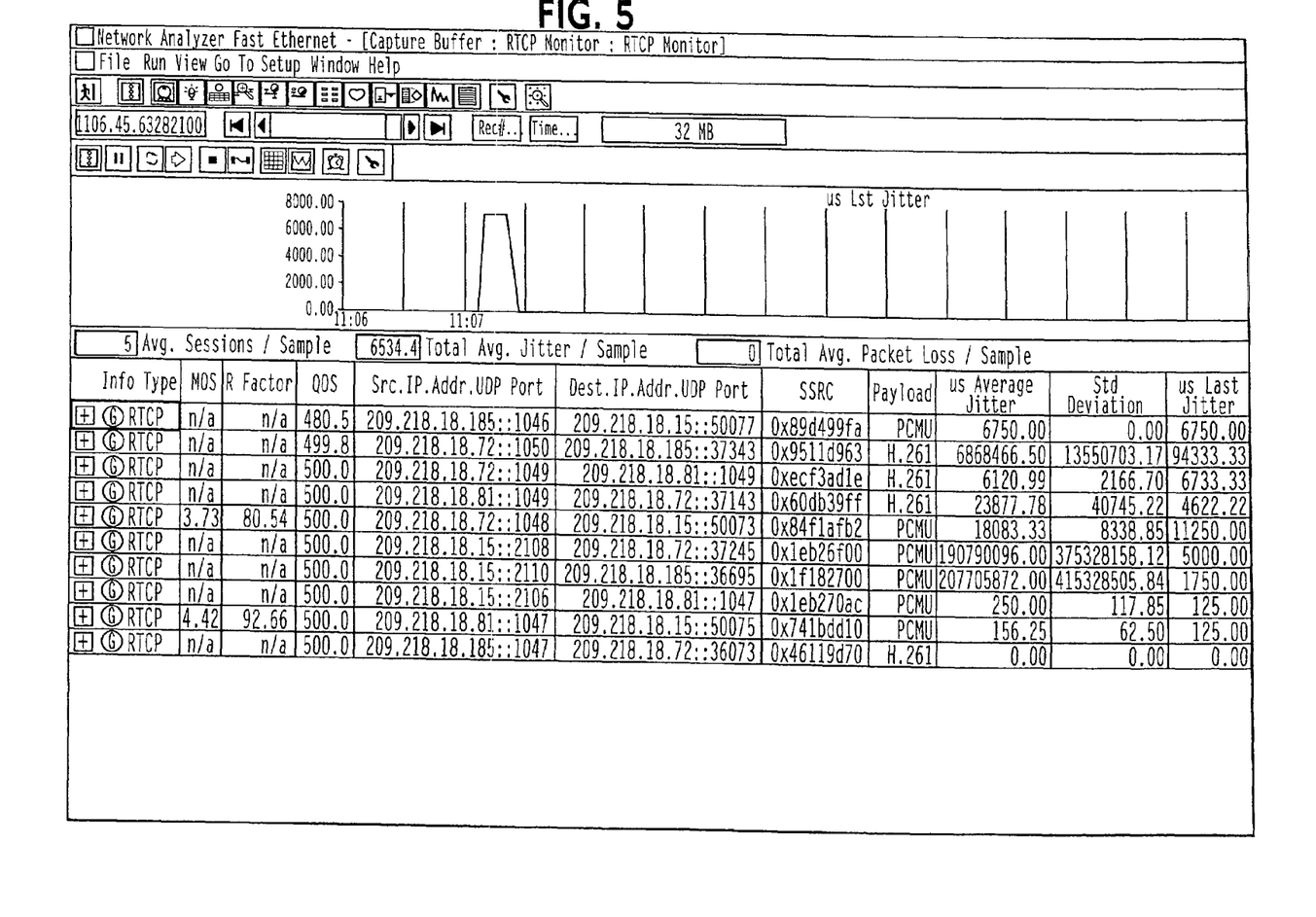
FIG. 5 is a diagram illustrating the RTCP SR/RR packets and corresponding data.

Thus, as shown in a bottom portion of FIG. 5, the network analyzer displays the RTCP SR/RR packets and the extracted data in a table format through a user interface (i.e., display screen) (not shown) connected to the network analyzer. The data displayed from the RTCP SR/RR packets includes the extracted jitter, the packet loss, the number of packets, and the octets. For instance the information extracted from the SR/RR packets are displayed as columns in the table and the RTCP SR/RR packets are displayed as rows in the table.

The user may select a row corresponding to the RTCP packets for a particular RTP stream. Upon selection of the row, the user interface may display graphs, as shown on a top portion of FIG. 5, illustrating the extracted jitter, the packet loss, the number of packets, or the octets, for instance, corresponding to the selected RTCP packet.

Figure 6:
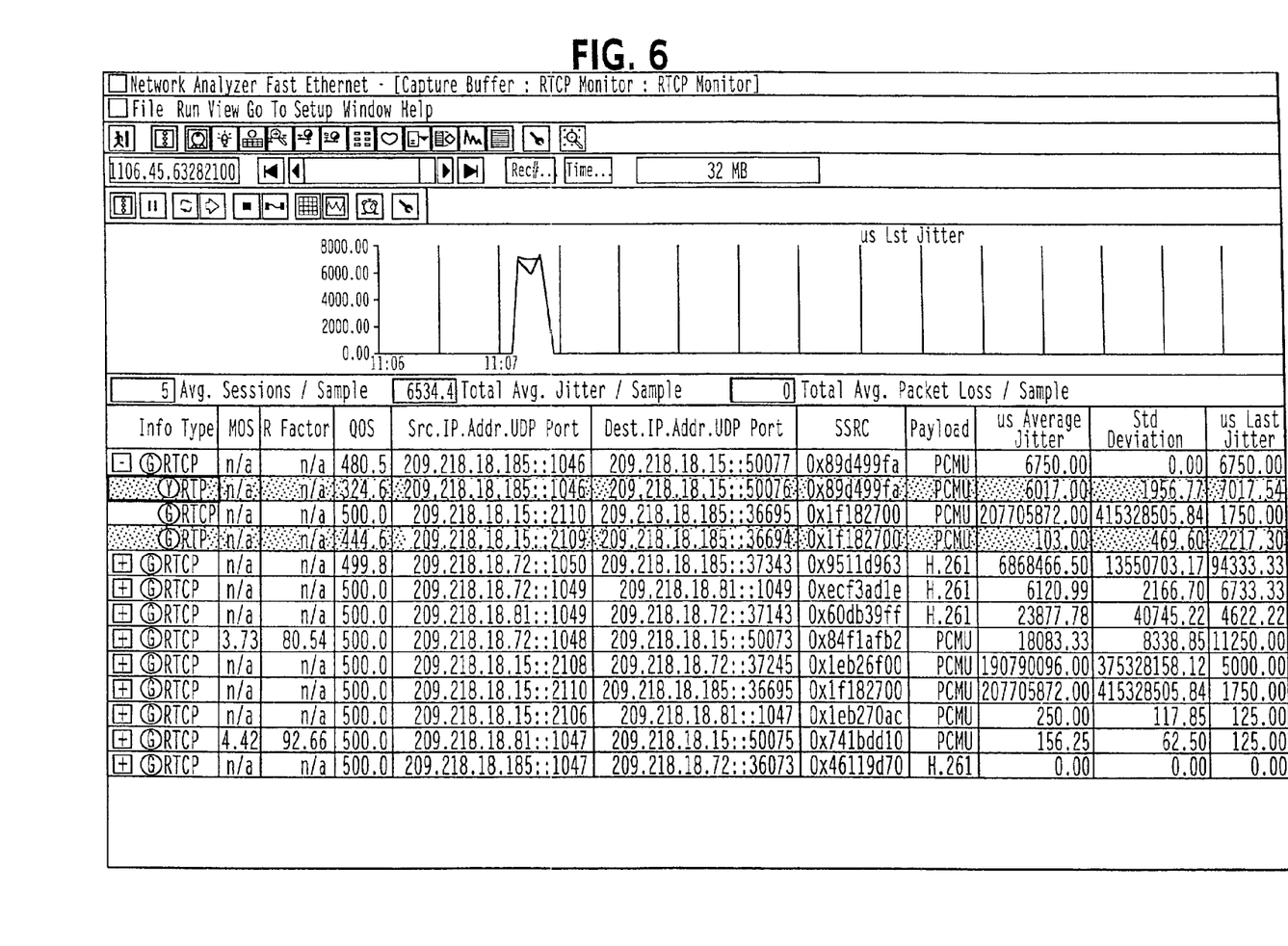
FIG. 6 is a diagram illustrating RTP streams associated with one of the RTCP SR/RR packets.

Furthermore, the network analyzer accumulates the RTP data associated with selected RTCP SR/RR information. As illustrated in FIG. 6, the RTP stream associated with a selected RTCP packet may be displayed. The user may click on any RTCP packet and the associated RTP streams, which are displayed along with data corresponding to the RTP streams.

The user may subsequently select at least one column for at least one of the data extracted from the RTCP SR/RR packets. The RTCP packets, and associated RTP streams, are then sorted based on the data in the selected column. For instance, if the user selects the column for the extracted jitter, the RTCP packets and/or the RTP streams are sorted from highest to lowest jitter data values. Once the RTCP rows of information are sorted with respect to the streams with the highest jitter data values, for instance, the user may proceed to select a predetermined number of RTCP packets and/or RTP streams having the highest jitter values. The RTP streams corresponding to the selected RTCP SR/RR packets and/or RTP streams may be further processed and additional data may be extracted therefrom to determine whether data transmission errors such as jitter, are originating from the source 10 end or from the receiver 12 end. The service engineer may use the additional data in the RTP streams in combination with the QOS to determine a location where the jitter, for instance, is originating.

Subsequently, the service engineer may connect the network analyzer closer to the receiver 12, for instance, and run the network analyzer once again to monitor the RTCP packets. If the amount of jitter obtained for the RTCP packets having the highest data values of information is lower than the previous data values obtained, then the service engineer would determine that at some point between the POA and the source 10 data transmission errors occur. The service engineer may subsequently connect the network analyzer 30 closer to the source 10 to ultimately locate that point within the network producing the data transmission errors.

Figure 7:
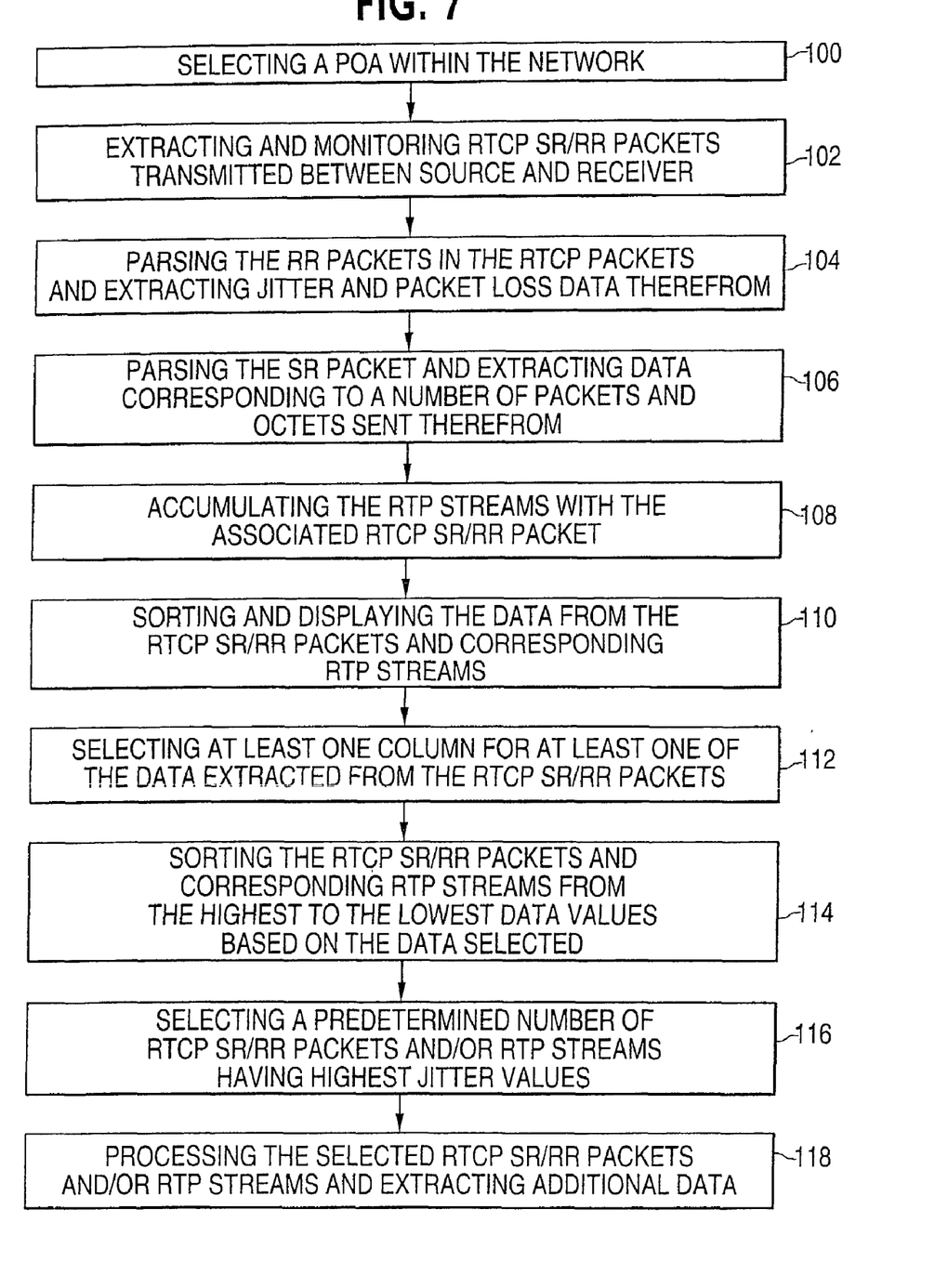
FIG. 7 is a flowchart illustrating a method to select and monitor RTCP SR/RR packets, in accordance with an embodiment of the present invention.

FIG. 7 is a flowchart illustrating a method to select and monitor RTCP packets and associated RTP streams, in accordance with an embodiment of the present invention. At operation 100, the POA is selected and the network analyzer is connected at the POA within the network. At operation 102, once the network analyzer is connected at the POA within the network, RTCP packets including SR/RR packets being transmitted between the source 10 and the receiver 12 are extracted and monitored. At operation 104, the RR packets in the RTCP packets are parsed and jitter and packet loss data are extracted therefrom. At operation 106, the SR packet is parsed and data corresponding to a number of packets and octets sent is extracted therefrom. The SR packets and the RR packets may be parsed sequentially or simultaneously. The information in a particular RTCP packet may contain an SR, which will contain data pertaining to the RTP data packets that the source has sent, and the RTCP packet may contain a RR, which will contain information about the RTP data packets that the source has received since the last RTCP packet that was sent by the source. At operation 108, the network analyzer accumulates the RTP streams with the associated or corresponding RTCP SR/RR packets. At operation 110, the network analyzer sorts and displays in a table format, for instance, the data from the RTCP SR/RR packets and/or associated RTP streams.

At operation 112, at least one column for at least one of the data extracted from the RTCP SR/RR packets is selected. At operation 114, the RTCP SR/RR packets and corresponding RTP streams are sorted in descending order based on the data selected. At operation 116, a predetermined number of RTCP SR/RR packets and/or RTP streams having the highest jitter values are selected. At operation 118, the selected RTCP SR/RR packets and/or the associated RTP streams are further processed and additional data is extracted therefrom to determine a location at or between the source 10 or towards the receiver 12 within the network producing data transmission errors The present invention has been described with respect to a system and method that utilizes the RTCP SR/RR packet information to select and monitor RTP streams having a worst-case jitter and packet loss within the network. In order to monitor RTCP SR/RR packet information, the network analyzer allows the system to be hooked up anywhere in the network between endpoints, thereby avoiding RTCP RR packets including jitter and packet loss information as seen from the endpoints of the network. By examining only the data corresponding to the selected RTP streams, the existing problem of insufficient processing power available to monitor all the RTP streams is resolved.

The system implementing the method described above includes permanent or removable storage, such as an application specific integrated circuit (ASIC), magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. Apparatus for monitoring RTP streams, the apparatus comprising:
   a network analyzer configured to i) monitor IP traffic between first and second endpoints within a network, ii) extract data from RTCP packets in the IP traffic, iii) display the data extracted from the RTCP packets via a user interface, iv) receive, via the user interface, a user selection of a number of the RTCP packets, v) monitor and extract data from RTP streams corresponding to the selected RTCP packets, and vi) display the data extracted from the RTP streams via the user interface, to enable a service engineer to monitor the RTP streams.

2. The apparatus of claim 1, wherein the network analyzer is configured for connection at a point of analysis intermediate the first and second endpoints.

3. The apparatus of claim 1, wherein the network analyzer is further configured to use the data extracted from the RTCP packets and the RTP streams to determine whether a source of data transmission errors in the network is located between the network analyzer and the first endpoint or between the network analyzer and the second endpoint.

4. The apparatus of claim 3, wherein the source of data transmission errors in the network is a source of worst-case jitter and packet loss within the network.

5. The apparatus of claim 3, wherein the network analyzer is further configured to i) determine a quality of service, and ii) use the data extracted from the RTP streams, in combination with the quality of service, to determine whether the source of data transmission errors in the network is located between the network analyzer and the first endpoint or between the network analyzer and the second endpoint.

6. The apparatus of claim 5, wherein the network analyzer is configured to determine the quality of service based on jitter and packet loss data extracted from the RTCP packets, where each of the jitter and packet loss data is provided a weighing value and thresholds.

7. The apparatus of claim 6, wherein the data extracted from the RTCP packets further comprises round-trip delay information calculated using a combination of packets, average jitter, standard deviation, and time duration of the RTP streams.

8. The apparatus of claim 1, wherein the RTCP packets comprise SR and RR packets, and wherein the network analyzer is configured to i) parse the RR packets and extract therefrom jitter and packet loss data, and ii) parse the SR packets and extract therefrom data corresponding to a number of packets and octets sent.

9. The apparatus of claim 1, wherein the network analyzer is configured to display the data extracted from the RTCP packets in a table.

10. The apparatus of claim 9, wherein the network analyzer is further configured to i) receive a user selection of extracted data displayed in a column of the table, and ii) sort rows of the table corresponding to RTCP packets, based on the user selection of extracted data displayed in the column of the table.

11. The apparatus of claim 1, wherein the network analyzer is further configured to display, for a user-selected one of the RTCP packets, at least one graph illustrating at least one of: extracted jitter, packet loss, number of packets, and octets, corresponding to the user-selected RTCP packet.

12. A method for monitoring RTP streams, the method comprising:
monitoring IP traffic between first and second endpoints within a network;
extracting data from RTCP packets in the IP traffic;
displaying the data extracted from the RTCP packets via a user interface;
receiving, via the user interface, a user selection of a number of the RTCP packets;
monitoring and extracting data from RTP streams corresponding to the selected RTCP packets; and
displaying the data extracted from the RTP streams via the user interface, to enable a service engineer to monitor the RTP streams.

13. The method of claim 12, wherein the monitoring is performed at a point of analysis intermediate the first and second endpoints.

14. The method of claim 12, further comprising, using the data extracted from the RTCP packets and the RTP streams to determine whether a source of data transmission errors in the network is located between the network analyzer and the first endpoint or between the network analyzer and the second endpoint.

15. The method of claim 14, wherein the source of data transmission errors in the network is a source of worst-case jitter and packet loss within the network.

16. The method of claim 14, further comprising:
determining a quality of service; and
using the data extracted from the RTP streams, in combination with the quality of service, to determine whether the source of data transmission errors in the network is located between the network analyzer and the first endpoint or between the network analyzer and the second endpoint.

17. The method of claim 16, wherein the quality of service is determined based on jitter and packet loss data extracted from the RTCP packets, where each of the jitter and packet loss data is provided a weighing value and thresholds.

18. The method of claim 12, wherein the RTCP packets comprise SR and RR packets, and wherein the method further comprises:
parsing the RR packets and extracting therefrom jitter and packet loss data; and
parsing the SR packets and extracting therefrom data corresponding to a number of packets and octets sent.

19. The method of claim 12, wherein the data extracted from the RTCP packets is displayed in a table.

20. The method of claim 19, further comprising:
receiving a user selection of extracted data displayed in a column of the table; and
sorting rows of the table corresponding to RTCP packets, based on the user selection of extracted data displayed in the column of the table.

* * * * *